May 26, 1970     A. SUTTER-CHRIST     3,513,769
JUICE PRESS
Filed Nov. 3, 1967     2 Sheets-Sheet 2
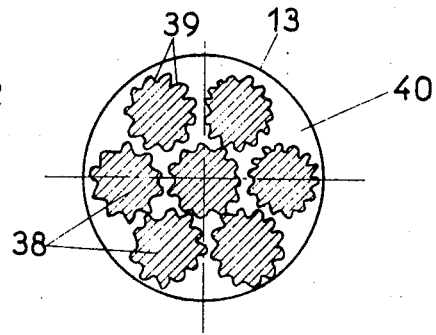
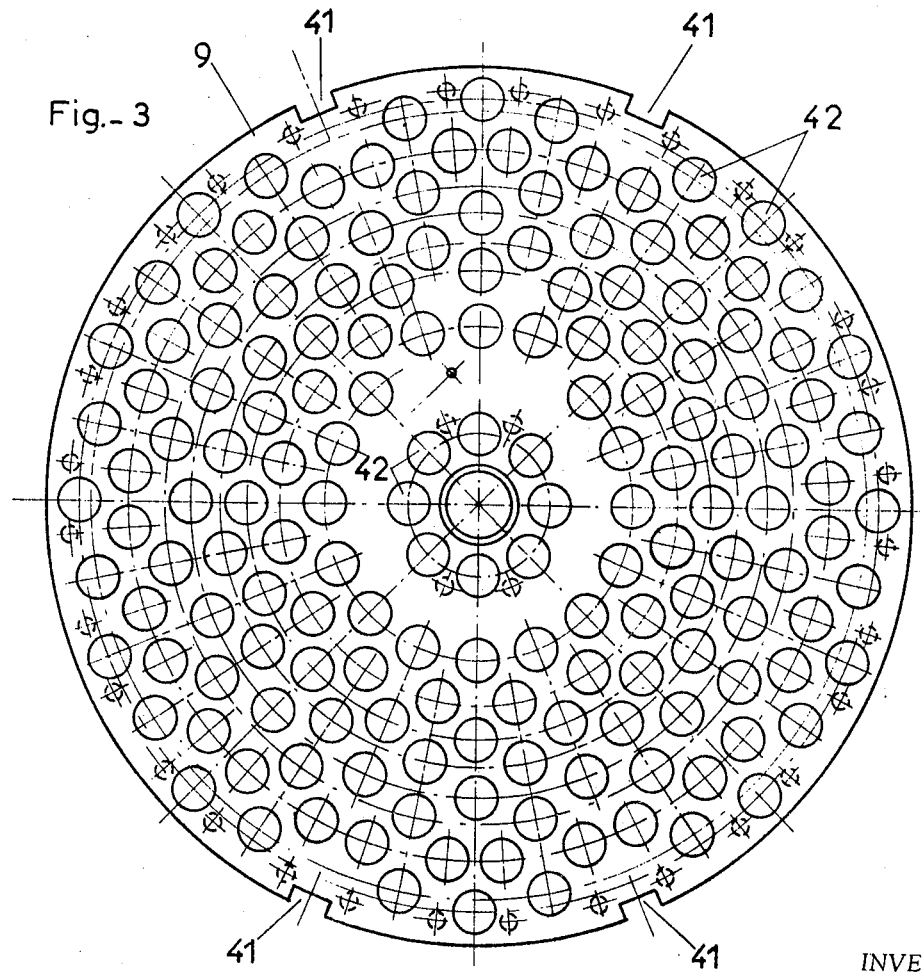
INVENTOR.
BY Anton Sutter-Christ United States Patent Office 3,513,769
Patented May 26, 1970

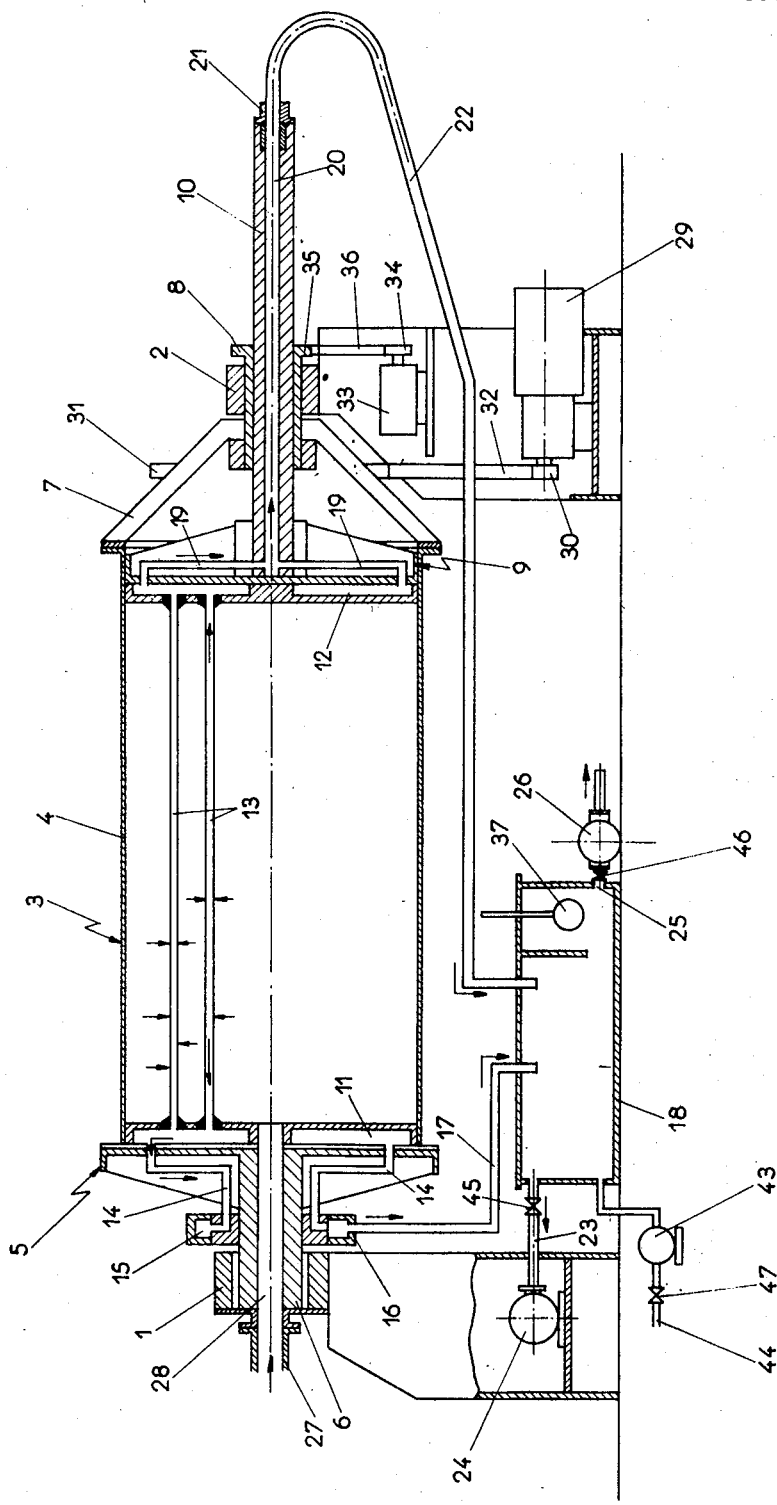

3,513,769
JUICE PRESS
Anton Sutter-Christ, Uzwil, Saint Gall, Switzerland, assignor to A. Sutter AG, Uzwil, Saint Gall, Switzerland
Filed Nov. 3, 1967, Ser. No. 681,063
Claims priority, application Switzerland, Nov. 7, 1966, 16,018/66
Int. Cl. B30b 9/02, 9/06
U.S. Cl. 100—107
15 Claims

ABSTRACT OF THE DISCLOSURE

In a juice press a drum is provided with two end walls one of which is movable toward and away from the other so as to subject fruit or similar material contained in the drum to compression and to express juice therefrom. A plurality of hoses are arranged in the interior of the container and communicate with the exterior thereof. Each of the hoses is liquid-permeable and comprises at least two coextensive elongated inserts which prevent the collapse of the hose during the compression of the material so as to assure free evacuation of juice from the drum.

BACKGROUND OF THE INVENTION

The present invention generally relates to the expression of juices from fruit, which term is here intended to encompass the widest biological interpretation which generally includes all useful plant products including grains and those which are popularly considered as "vegetables."

More particularly, the present invention relates to an apparatus for expressing juice from fruit.

It is known to construct juice presses with a drum into which the product to be processed is introduced, for instance in form of mash. Thereupon a pressure plate or ram advances from one end of the drum towards the other and the mash, which term hereafter will be used purely for the sake of convenience but is not intended to indicate a limitation to products which are or must be converted to mash prior to juice expression, is subjected to compression. Conventionally the peripheral wall of the drum was provided with openings through which the expressed juice was allowed to flow off. However, for various reasons this type of construction was not entirely satisfactory, particularly with respect to the evacuation of expressed juice from the interior of the drum. It has therefore recently been replaced with presses wherein a plurality of drainage hoses are arranged within the space into which the material to be processed is introduced, and which hoses are accordingly subjected to pressure when compression of the material to be processed is effected. These hoses consist of a liquid-permeable outer wall, a construction which has the advantage not only that fluid can pass into the interior of the hoses over the entire length thereof but which also result in simultaneous filtration of the liquid. Of course, being subjected to the compressive pressure the hoses would be collapsed and prevent flow-off of liquid were it not for the fact that they are prevented from so doing by the presence of a core or insert which extends through the hose longitudinally thereof, and which is preferably provided with longitudinally extending external grooves. This insert consists of resiliently yieldable material and is sufficiently resistant to pressure to be able to prevent collapse of the hose during the compression stage. The expressed juice then flows off through the grooves in the insert.

While this arrangement would at first sight appear to provide a highly satisfactory solution to the aforementioned problem, it has nevertheless been found that disadvantages still prevail. Firstly, the insert is of relatively substantial cross-sectional area because it must substantially fill the interior of the hose to prevent collapse thereof. This presents a problem in that the flexibility of the so-constructed hose is considerably reduced by such an insert, making it impossible for the hose to convolute as is necessary as the compression process proceeds, particularly if the hoses are connected to an end wall of the drum and to the pressure plate. Evidently, such resistance to convolution is disadvantageous because it has a tendency to prevent maximum expression of juice.

Furthermore, and even more importantly, it is clear that expressed juice can flow off through each hose only through that portion of the cross-sectional area of the hose interior which corresponds to the cross-sectional area of the grooves provided in the insert. These grooves, however, must be neither particularly wide nor particularly deep, it being clear that in the first case the material of the hose would be collapsed into the grooves, closing the same, while in the second case the projecting ridges bounding the grooves could be deformed by being bent over into the adjacent grooves and would again act as an obstruction to flow of juice. With respect to this problem, then, it can be stated that only a small portion of the cross-sectional area of the interior of each hose is available for the flow of juice so that the evacuation thereof is unnecessarily slow and the speed of operation of presses so equipped is curtailed.

Finally, the prior-art juice presses rely for evacuation of the expressed juice exclusively on the pressure which develops within the drum. If the expressed juice could flow freely under this pressure this arrangement would quite possibly be satisfactory. However, given the flow limitations imposed by the small proportion of the interior cross-sectional area of the hose which is available for flow-off of the juice, this results in a significant increase of the time required for carrying out a pressing, it being evident that the expression of additional juice is limited by the ability of the already present quantities of juice to leave the interior of the drum. Added to this is the fact that prior-art processes of this type are already handicapped in their efficiency by the fact that the pressure in successive stages of each pressing is always identical.

A final drawback of known juice presses is the fact that they can be cleaned only with difficulty, namely by being disassembled so that the individual components may be washed. In view of the fact that such cleaning must be carried out periodically, and relatively frequently at that, it is clear that this also constitutes a significant disadvantage.

SUMMARY OF THE INVENTION

The present invention overcomes these disadvantages outlined above.

More particularly, the present invention provides a juice press which is not subject to the above-enumerated drawbacks.

The press according to the present invention is significantly more efficient than those known in the prior art in that it permits the expression of juices more quickly.

The removal of juices from the interior of the drum provided in the press according to the present invention is effected or at least assisted by applying a suction so that the expression of additional juice can take place at the maximum speed of operation of which the press is capable rather than having to await evacuation of previously expressed juice.

Moreover, in the press according to the present invention the evacuation of juice is speeded by the fact that a considerably larger portion of the cross-sectional interior area of each hose is available for the juice to flow off, while the hoses are flexible enough to readily assume convoluted form but are fully capable of resisting collapse under the influence of pressure prevailing in the interior of the drum.

Finally, the press according to the present invention can be readily cleaned without required disassembly and washing of the constituent components, and for this purpose I provide for the circulation of a cleaning or washing liquid through the press in a manner which will be discussed in more detail hereafter.

In accordance with one feature of my invention I provide, in a juice press which is particularly suitable for expressing fruit juices, the combination of container means which defines therewithin an enclosed interior space into which material from which juice is to be expressed can be introduced, and compressing means for compressing such material. The compressing means includes a compressing member arranged within the space into the container means and operative for subjecting the material therein to mechanical compression whereby to effect expression of juices from the material. Finally, my novel press also includes hose means, which is constituted by at least one liquid-receiving hose arranged within the space for the material from which juice is to be expressed and provided with an outlet through which the expressed juice is evacuated from the space. This hose includes, also in accordance with the invention, at least two elongated substantially coextensive inserts which are received therein and which extend in longitudinal direction thereof to thereby prevent collapse of the hose upon operation of the compressing member. These inserts have a combined cross-sectional area which is smaller than the cross-sectional area of the hose.

In accordance with a further concept of my invention each of the two or more stages to which each pressing, that is each batch of material introduced into the container means, is subjected can take place at a pressure which is higher than the preceding stage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a somewhat diagrammatic longitudinal section through a juice press embodying my invention;

FIG. 2 is a transverse section through a juice-evacuating hose for use in the press illustrated in FIG. 1, and constructed in accordance with another embodiment of my invention; and FIG. 3 is a plan view of a pressure plate for use in the press illustrated in FIG. 1, and showing the connection of juice-evacuating hoses thereto.

DESCRIPTION OF THE PREFERRED EMBODIMENTS

Discussing now the drawing in detail, and firstly FIG. 1 thereof, it will be seen that reference numerals 1 and 2 indicate bearings which support a drum 3 for rotation. The drum 3 consists of a peripheral wall 4 and is of generally cylindrical shape. At one end of the drum 3 a pressure plate 5 is fixedly connected to the peripheral wall 4, and this plate 5 thus constitutes a fixed end wall of the drum 3. Arranged at the other end of the drum 3 is a movable pressure plate 9 which is rigidly connected with a shaft or spindle 10, the latter being hollow in the illustrated embodiment, and which spindle 10 is externally screw-threaded so as to mesh with internal screw threads in a spindle nut 8.

As is evident from FIG. 1 the drum 3 is provided at one end with a stub shaft 6 which is supported in the bearing 1 and is rigidly connected with the pressure plate 5. The stub-shaft 6 is hollow and thus provides an inlet passage 28 which communicates with the interior of the drum 3. At the opposite end the drum 3 is rigid with a frusto-conical frame 7 which is supported on the spindle nut 8, the latter being rotatably mounted in the bearing 2 but being fixed against axial movements therein. The fixed pressure plate 5 is hollow and provided in the illustrated embodiment with an annular collecting chamber 11, just as the movable pressure plate 9 is similarly provided with an annular collecting chamber 12.

Located within the interior space defined by the peripheral wall 4 and the pressure plates 5 and 9 are a plurality of drainage hoses 13, of which only two are shown. The number of such hoses may conceivably be reduced to one, although in practice this is not done, but will usually be much higher and may, depending upon the size of the press, reach 170 or even more hoses. FIG. 1 clearly shows that each of the hoses 13 communicates in the illustrated embodiment with the collecting chamber 11 as well as with the collecting chamber 12, it being understood of course that one of these chambers, for instance the chamber 11, could be eliminated entirely. The hoses 13 are connected to the chambers 11 and 12 through the intermediary of strainers, illustrated but not identified with reference numerals, to assure that no solids can enter into the chambers 11 and 12, if, as a result of rupture of one of the hoses, such solids should be able to enter the interior of the hose.

A conduit 14 connects the collecting chamber 11 with an annular compartment 15 which, in turn, is connected with a juice receptacle 18 via a pipe 17 communicating with the annular compartment 15 by means of a rotary stuffing box. The flow of juice through the conduit 14 and the pipe 17 into the receptacle 18 is indicated by the arrows associated with the respective components.

Similarly, the collecting chamber 12 is connected by conduits 19 with a central bore or passage 20 provided in the hollow spindle 10, which passage 20 is also connected with the juice receptacle 18, namely by means of a pipe 22 which is fluid-tightly joined with the outlet end of the passage 20 by means of a stuffing box 21.

A vacuum pump 24 is connected with the upper portion of the receptacle 18 by means of a conduit 23 and it is clear that the suction resulting in the interior of the receptacle 18 will serve to withdraw expressed juice from the interior of the drum 3 through the collecting chambers 11 and 12 and through the respective conduit connecting these with the receptacle 18. The reason for locating the connection with the vacuum pump 24 in the upper portion of the receptacle 18 is obvious inasmuch as it must of course be prevented that the pump 24 withdraw juice contents of the container 18. For this latter purpose the lower portion of the receptacle 18 is provided with an outlet conduit 25 which communicates via a valve 46 with a pump 26 from where the juice withdrawn from the receptacle 18 is forwarded to more permanent storage facilities.

The passage 28 in the stub shaft 6 of the drum 3 has already been identified as an inlet passage. With it communicates a conduit 27 so that material from which juice is to be expressed, for instance mash obtained by communicating food or the like, is introduced into the interior of the drum 3. The latter, incidentally, is rotated by an electromotor 29 whose output gear 30 drives a ring gear 31, which latter is mounted on the frame 7, through the intermediary of a chain 42. For purposes which are soon to be described I find it advantageous also to provide for independent rotation of the spindle nut 8, and for this purpose I provide an additional electromotor 33 whose output gear 34 drives the gear 35 which is for instance integrally formed on the spindle nut 8 via the chain 36 so that the spindle nut 8 may, in accordance with the invention, be rotated in the direction opposite the rotation of the drum 3.

Finally it will be seen that an additional pump 43 is provided which is connected also with the receptacle 18 and which is supplied with a cleaning or flushing liquid, for instance water, by a pipe 44. Thus it is not necessary to disassemble the press when cleaning thereof is desired. Rather, the cleaning liquid supplied by the pipe 44 is circulated by the pump 43 into the receptacle 18 from there through the respective conduits into the interior of the drum 3. This, of course, assumes that no pressing operations are being carried out at the time and that no juice is contained in the receptacle 18. The conduits 23, 25 and 44 are respectively provided with valves 45, 46 and 47 to enable change-over of the system, from one operational stage in which pressing takes place to another operational stage in which the system can be flushed and cleaned. It is advantageous to provide the receptacle 18 with a float 37 which is connected in well-known manner with the pump 26 so as to effect automatic activation and deactivation of the latter in response to changes in the level of liquid in the interior of the receptacle, as will be more fully explained subsequently.

The operation of the press disclosed in the foregoing will be obvious, particularly in conjunction with FIG. 1. Material from which juice is to be expressed is introduced into the interior of the drum 3 through the conduit 27 and the inlet passage 28. At this time the movable pressure plate 12 is in the illustrated position in which it is withdrawn to the maximum extent towards the right-hand end of the drum 3. While this has not been specifically illustrated in the drawing it will be evident that means must be provided in the conduit 27 or in the passage 28 to prevent return flow of material from the interior of the drum back through the passage 28 and/or the conduit 27. For this purpose a one-way valve may be provided which will permit entry of material into the drum 3, but will preclude return flow of the material.

When the interior of the drum 3 is filled to the requisite level, the drum 3 is rapidly rotated by the motor 29, and such rotation is transmitted via the pressure plate 9 to the spindle 10. The latter accordingly rotates in the spindle nut 8 and the pressure plate 9 now advances in the direction towards the left-hand side of FIG. 1, namely towards the stationary pressure plate 5. During such advancement the material located between the pressure plates 5 and 9 is subjected to compression and juice is expressed therefrom. Because of the movement of the pressure plate 9 the drainage hoses 13, which are of course located in the mass of material which is being thus compressed, become convoluted. The juice expressed by advancement of the pressure plate 9 in the aforementioned manner enters through the liquid-permeable wall of the drainage hoses 13 and is evacuated through the same into the collection chambers 11 and 12, partly as a result of the pressure prevailing in the interior of the drum 3 and partly as a result of the suction applied by the suction pump 24. From the chambers 11 and 12 the juice is then conveyed into the receptacle 18 in the manner which is obvious from the earlier comments and from a consideration of FIG. 1. Such prompt removal of expressed juice from the drainage hoses 13 immediately provides room for the entry of additional liquid thereinto so that the speed of compression can proceed at the maximum pace of which the press is capable and is not delayed by inadequate flow-off of juice in the hoses 13. I have found it advantageous if the pressing is subdivided into a plurality of stages. Suitable control devices for effecting the necessary control of the press are well-known in the art and need not be specifically described. It may suffice to point out that as soon as a certain predetermined level of pressure has been reached in the interior of the drum as a result of the advancement of the pressure plate 9 towards the pressure plate 5, a conventional pressure relay acts to reduce the speed of rotation of the electromotor 29 and thereby the speed of rotation of the drum 3. This, of course, results in slower advance of the movable pressure plate 9 in the direction towards the pressure plate 5 and the pressure in the interior of the drum now rises only slowly until a predetermined maximum pressure has been reached, at which the pressure relay terminates rotation of the drum 3 entirely. The suction pump 24 may have been operating during the entire time period, or it may now be activated for removing or assisting in removing the expressed juice from the interior of the drum 3. This will evidently result in a decrease of the pressure prevailing in the interior of the drum 3, and if desired the control device can be so programmed that it will respond to this pressure decrease and will initiate new rotation of the drum 3 and consequent advancement of the pressure plate 9 until the maximum interior pressure in the drum 3 is again reached. This can be repeated one or more times.

When the maximum desired initial expression of juice from the material in the drum 3 has been obtained, the motor 29 again rotates the drum 3 but in reverse direction so as to effect withdrawal of the pressure plate 9 from the left-hand side in the drawing in the direction towards the right-hand side and to its starting position. To speed the withdrawal of the pressure plate 9 the motor 33 can be utilized and will rotate the spindle nut 8 in the direction opposite the direction of rotation of the drum 3 whereby a faster return of the pressure plate 9 to its starting position is obtained than would otherwise be the case. Now, and with the original batch of material to be processed still contained in the drum 3, the pressing process is again carried out but this time to the point at which the internal pressure prevailing in the interior of the drum 3 is higher than the maximum pressure reached during the first step. This can be repeated one or more times and I prefer that in each successive step or pressing the maximum pressure obtained be higher than the maximum pressure which was reached during the preceding pressing. The total number of such pressings to which each batch of material is subjected will of course largely depend upon the type of material which is being processed, but a total of four pressings will usually suffice. When the last pressing is completed and the movable pressure plate withdrawn to its starting position, the residue must be removed from the drum. For this purpose the drum is provided with (non-illustrated) openings which can be sealed during the pressing operation and which are opened when the residue is to be removed. This is advantageously accomplished, incidentally, by slowly rotating the drum 3 so that the residue can fall out of the openings. Thereupon the openings are again closed and the drum can be charged with a new batch of material.

It has already been pointed out that the pump 26 is provided for withdrawing juice from the receptacle 18. Advantageously this pump 26 is controlled by the float 37 which acts upon the pump 26 to control operation thereof in dependence upon the level of liquid in the receptacle 18, in a well-known manner which need not be further described, for instance by means of a relay associated with this arrangement. The purpose of the float 37 is, of course, to assure that the juice in the receptacle 18 does not rise to a level at which it could be drawn into the connecting conduit 23 which connects the interior of the receptacle 18 with the suction or vacuum pump 24. It will be evident that the pump 26 may be switched on and off by the arrangement controlled by the float 37 whenever a predetermined maximum or minimum level of juice in the receptacle 18 is reached, and this may take place several times during a single pressing.

When the press is not in operation, that is when no pressing is being effected so that the plate 9 is in its starting position and the receptacle 18 is completely empty, the press can be cleaned without necessitating disassembly of any components, simply by closing the valves 45 and 46 and opening the valve 47. Operation of the pump 43 will now circulate flushing or cleaning liquid through the press by initially introducing this liquid under pressure into the receptacle 18 and advancing it from there in the direction opposite the arrows associated with the respective conduits and into the interior of the drum 3. Advantageously the drum 3 will be slowly rotated as this takes place and the cleaning liquid can subsequently be evacuated by opening the apertures provided in the peripheral wall 4 of the drum 3, as described above with respect to evacuation of residual material.

FIG. 2 in cross section how the drainage hoses 13 can be constructed in accordance with one embodiment of the invention. In this embodiment the drainage hose 13 is assumed to consist of a woven fabric of synthetic plastic material, for instance nylon, the density of the weave being selected in accordance with the material which is to be pressed so as to obtain maximum filtration. However, the weave and the density thereof does not constitute a part of the inventive concept, and it is sufficient that the material of the hoses 13 be liquid-permeable. In accordance with the invention, however, there are arranged within the hoses 13 a plurality of elongated substantially coextensive inserts. It has already been pointed out before that the number of such inserts may vary as low as two, but in the embodiment illustrated in FIG. 2 I have illustrated seven such inserts which are identified with reference numerals 38. The inserts 38 consist advantageously of a synthetic plastic material which is resistant to compression and they are provided on their external surfaces with longitudinally extending grooves 39 which extend in parallelism with the longitudinal axis of each insert 38. However, the grooves 39 may equally well be helically convoluted about the respective inserts 38.

It is evident that as a result of the fact that the total cross-sectional area of all of the inserts 38 is significantly less then the total cross-sectional area in the interior of the hose 13, and as a result of the fact that there will always remain free interspaces between the inserts 38 and the hose 13 on the one hand and between the inserts 13 themselves on the other hand, a relatively large portion of the cross-sectional area in the interior of the hose 13 is and will always remain available for flow-off of the juice.

Because I provide two or more of the inserts 38, rather than a single one as is known from the art, the flexibility of a hose so constructed will be considerably greater than known from the prior art. At the same time the depth and width of the grooves 39 can be relatively small and need certainly not be in excess of what is known from the single inserts of the prior art, but will nevertheless be sufficient, in conjunction with the free spaces between the hose 13 and the inserts 38 on the one hand, and the inserts 38 between themselves on the other hand, to allow for flow-off of juice which is considerably accelerated over what is known from the prior art.

Coming, finally, to FIG. 3 it will be seen that I have illustrated there a plan view of the movable compression plate 9 shown in FIG. 1. The axially extending peripheral grooves 41 provided in the plate 9 receive guide ridges (not shown) on the interior of the drum 3 so that the plate 9 is guided for proper movement therewithin in the manner which has already been discussed, this being necessary also to assure that the plate 9 will rotate in conjunction with the drum 3 when the same has rotary movement imparted thereto. The inlets 42 can of course be arranged in any desired manner and the illustrated arrangement is by way of example only. The point to remember here is that to each of the inlets there is connected one of the hoses 14 and it is clear that the number of such inlets, and consequently the number of hoses 13 utilized in the press, can be varied at will and may be rather high, reaching, as already pointed out, a figure of 170 or more.

The advantages of my novel press and hose construction have already been suggested and will, in fact, be quite obvious from what has been said before and from a consideration of the drawing. Clearly, my invention not only permits a significant increase in the speed with which a pressing can be effected, but also results in an increased yield of expressed juice. Particularly the quick flow-off of juice, resulting from the construction of the drainage hoses and also from the application of suction to facilitate removal of the juice, contributes in large measure not only to an increase in the speed of pressing but also to a more complete expression of juice, and this is still further enhanced to the maximum practical limit by the concept of the invention according to which the pressure applied is increased in each successive pressing over the preceding one. Furthermore, cleaning of the novel press can be effected quickly and without any need for skilled or even semi-skilled help as would otherwise be necessary to assure proper disassembly and reassembly of the various components.

It will be understood that each of the elements described above, or two or more together, may also find a useful application in other types of applications, differing from the types described above.

While the invention has been illustrated and described as embodied in a juice press, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a juice press, particularly for expressing fruit juices, the combination of container means defining an enclosed interior space adapted to receive material from which juice is to be expressed; compressing means, including a compressing member arranged within said space and operative for subjecting the material therein to mechanical compression to thereby effect expression of juices from such material; and hose means, including at least one liquid-receiving hose arranged within said space and having an outlet through which juice expressed from material in said space is evacuated therefrom, said hose comprising at least two elongated inserts received therein extending in longitudinal direction of said hose at least substantially coextensive with the same and with one another so as to prevent collapse of said hose upon operation of said compressing member, said inserts having a combined cross-sectional area less than the cross-sectional area of said hose hand defining with one another internal channels and with said hose external channels all of which extend longitudinally of said base.

2. In a juice press as defined in claim 1, wherein said hose is of substantially circular cross-section, and wherein said inserts are of other-than-circular cross-section.

3. In a juice press as defined in claim 1, and further comprising at least one additional one of said elongated inserts received in said hose.

4. In a juice press as defined in claim 1, wherein said inserts are of solid cross-section.

5. In a juice press as defined in claim 1, wherein said inserts are provided with longitudinal grooves in the respective outer surfaces thereof.

6. In a juice press as defined in claim 5, wherein said longitudinal grooves are helical grooves.

7. In a juice press as defined in claim 1, wherein said hose is liquid-permeable so as to allow for entry of expressed juice thereinto.

8. In a juice press as defined in claim 1, and further comprising receptacle means exteriorly of said container means and adapted to receive expressed juices therefrom; and conduit means including a conduit connecting said outlet and said receptacle means so that said hose communicates with the latter.

9. In a juice press as defined in claim 8, and further comprising pump means associated with said receptacle means and operable for evacuating juice therefrom.

10. In a juice press as defined in claim 8, and further comprising flushing means operatively associated with said receptacle means and said container means and operable for effecting circulation of a cleaning liquid therethrough and through said hose means.

11. In a juice press as defined in claim 10, wherein said flushing means comprises pipe means supplying a cleaning liquid to said receptacle means, and pump means associated with said receptacle means and operative for circulating cleaning fluid from said receptacle means through said container means and hose means, said pump means being operative in the absence of cleaning liquid and in the presence of juice in said receptacle means for wthdrawing said juice therefrom.

12. In a juice press as defined in claim 9, and further comprising vacuum means associated with said receptacle means and operative for maintaining therein a pressure smaller than the pressure in said space for assisting in evacuation of expressed juice from said space and through said hose means.

13. In a juice press as defined in claim 1, wherein said container means is a drum having opposite ends, said compressing member being a pressure plate having a cross-section corresponding substantially to the cross-section of said space and being movable therein in direction from one end of said drum toward and away from the other end.

14. In a juice press as defined in claim 13, wherein said pressure plate is provided with an internal collection chamber, said outlet of said hose communicating with said collection chamber; and wherein a spindle is provided with an axial liquid passage communicating with said collection chamber so that juice is evacuated from the latter through said passage.

15. In a juice press as defined in claim 13, wherein said compressing means comprises an externally threaded spindle and an internally threaded spindle nut, said spindle nut being rotatable with reference to said spindle in a first direction of rotation, and said spindle being rotatable with reference to said spindle nut in an opposite second direction of rotation for effecting longitudinal displacement of said spindle in said spindle nut in mutually opposite directions.

References Cited

UNITED STATES PATENTS

| | | |
|---|---|---|
| 512,790 | 1/1894 | Bachman. |
| 1,686,096 | 10/1928 | Manning _____ 100—90 XR |
| 1,809,130 | 6/1931 | Macomber _____ 100—107 XR |
| 2,109,559 | 3/1938 | Wickert _____ 100—125 XR |
| 3,103,164 | 9/1963 | Willmes _____ 100—107 |
| 3,207,064 | 9/1965 | Hauser-Bucher ___ 100—116 XR |

PETER FELDMAN, Primary Examiner

U.S. Cl. X.R.

100—90, 112, 125